Patented Jan. 31, 1928.

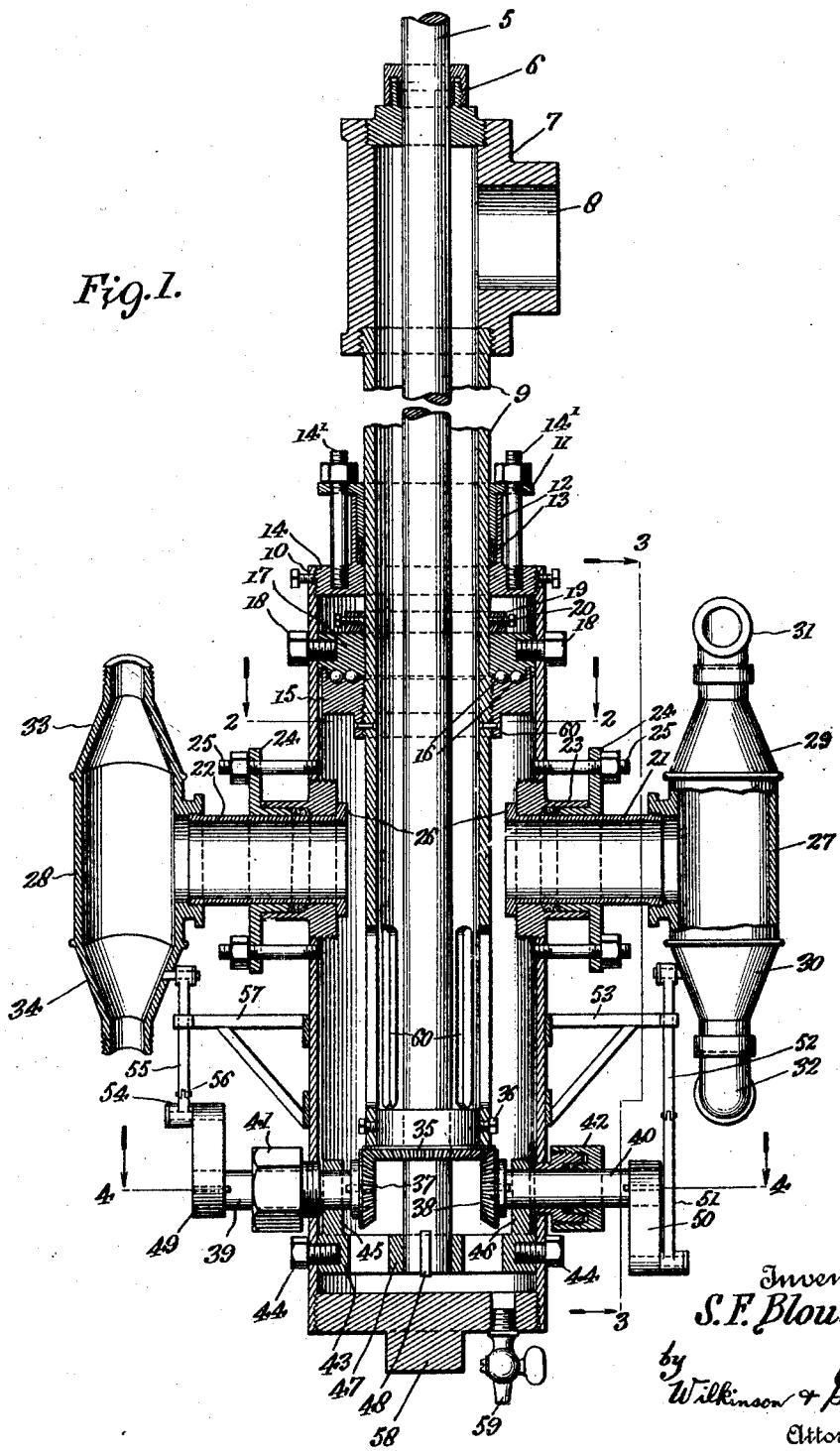

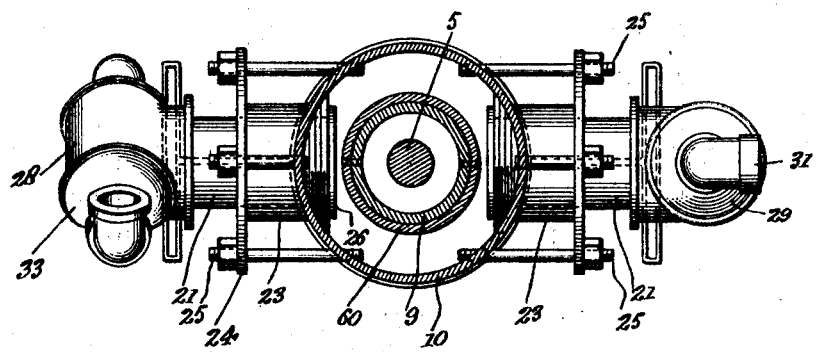
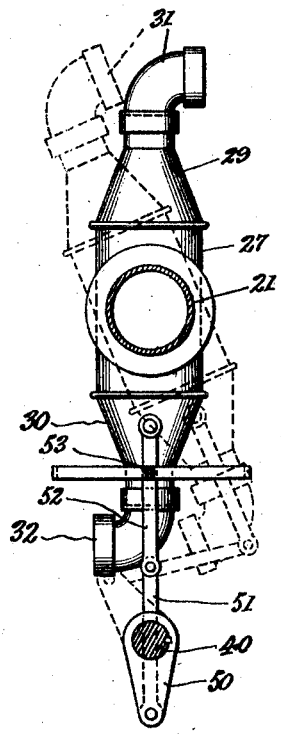
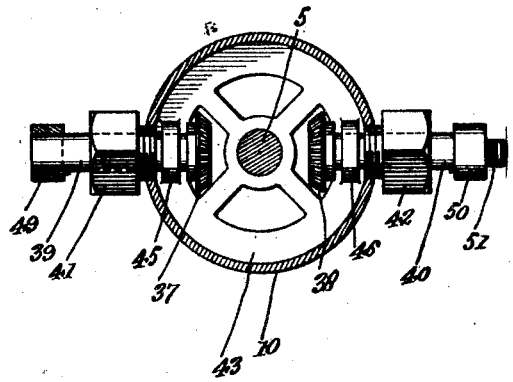

1,657,990

UNITED STATES PATENT OFFICE.

STEPHEN F. BLOUIN, OF BATON ROUGE, LOUISIANA, ASSIGNOR OF ONE-THIRD TO JOSEPH M. FABRE AND ONE-THIRD TO AUGUST O. MINKS, BOTH OF BATON ROUGE, LOUISIANA.

TANK-WASHING MACHINE.

Application filed May 10, 1927. Serial No. 190,259.

The present invention relates to improvements in tank washing machines, and has for an object to provide a compact, inexpensively constructed and efficient machine adapted to be inserted in oil tanks, ship tanks, tank cars, storage tanks, oil barges and the like for the purpose of internally washing the same with water, oil either hot or cold, caustic soda solution, etc.

Another object of the invention is to provide a tank washing machine in which economy in the use of motive power and cleansing fluid is had by reason of the high efficiency of the machine.

A further object of the invention lies in providing an improved tank washing machine in which provision is made for the application of the fluid to all internal parts of the tanks from one position of the machine without requiring any movement or adjustment of the machine in the tank.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through an improved tank washing machine constructed in accordance with the present invention.

Figure 2 is a cross section taken on the line 2—2 in Figure 1.

Figure 3 is a vertical section taken on the line 3—3 in Figure 1, and

Figure 4 is a horizontal section taken on the line 4—4 also in Figure 1.

Referring more particularly to the drawings, 5 designates the power shaft, which may be driven by an air, electric or other motor. This shaft extends down through a stuffing box 6 and through a T 7 connecting at one side 8 with a source of cleansing fluid supply, such as water, caustic soda, or the like.

The lower portion of the T is threaded, or otherwise connected with a non-rotative barrel 9, which extends down and into the rotary drum 10. Where the barrel passes into the drum a stuffing box is provided including the adjustable gland 11, receiving box 12, packing material 13, and the adjusting bolts 14 for the gland, which may be threaded into the upper head 14 of the rotary drum 10.

The drum is supported for free rotary movement from the barrel 9 and to this end the barrel carries an annular ring 15 threaded or otherwise secured thereto and having races for receiving the ball or other antifriction bearings 16, which support the complemental ring 17 affixed, as by the bolts 18 to the drum 10.

A set collar 19 is affixed to the barrel 9 as by the set screws 20, this collar being disposed just above the annular ring 17, which supports the rotary drum 10 upon the barrel ring 15.

Projecting from diametrically opposite sides of the intermediate portion of the barrel are a pair of branch pipes 21 and 22 communicating internally with the interior of the barrel and preferably extending through stuffing boxes 23 having the glands 24 and the adjusting bolts 25. The pipe sections 21 may be rotatable in the stuffing boxes and are flanged, as indicated at 26, at their inner ends to avoid withdrawal outwardly through the stuffing boxes. The outer ends of the pipe sections 21 carry the fluid spray heads 27 and 28. The spray head 27 is disposed with its axis at substantially right angles to the axis of the pipe section 21 by which it is carried.

At opposite ends of the spray head 27 are frusto-conical nipples 29 and 30 carrying the spray nozzles 31 and 32. These spray nozzles are carried removably by the nipples, and spray nozzles of various forms may be provided for directing the fluid in desired directions from the spray heads.

As shown in the drawings the nozzles are of the elbow form. In case the nozzles are left off, as shown to the left in Figure 1, the cleansing fluid will issue axially of the spray head 28, which is provided with the tapering nipples 33 and 34 at its upper and lower ends causing the stream of fluid to converge and issue through a narrow orifice, whereby to develop relatively great force in the stream of cleansing fluid.

It is also desired in accordance with the present invention to impart to the spray heads 27 and 28 an oscillating motion about a diametric axis of the drum 10 or about the axes of the pipe sections 21 and 22. For this purpose the lower end of the non-rotative barrel 9 is extended down to carry the stationary bevel gear wheel 35 affixed as by the set screws 36 to the barrel end.

Bevel pinions 37 and 38 are disposed beneath and in mesh with the gear wheel 35, so that as the barrel rotates the pinions 37 and 38, running around beneath the fixed gear wheel 35 will communicate rotary movement to the pinion shafts 39 and 40 which extend through the stuffing boxes 41 and 42 mounted diametrically in the lower portion of the rotary drum 10.

A spider 43 secured as by set screws 44 in the lower portion of the drum is provided with upstanding bearings 45 and 46 for the inner end portions of the pinion shafts 39 and 40 and also this spider 43 is provided with a central bearing 47 into which the lower end of the power shaft fits and is keyed, the key being indicated at 48.

The outer ends of the pinion shafts 39 and 40 carry the crank arms 49 and 50. The crank arm 50 is connected by the links 51 and 52 to the spray head 27 or to its nipple 30 and the link is guided in the guide 53, shown as supported on the rotary drum 10.

In like manner the opposite crank arm 49 is coupled by the links 54 and 55 jointed together as indicated at 56 to the other spray head 28. The link 55 oscillates in the guide bracket 57 affixed to the rotary drum 10. The lower end of this drum is closed by the removable drum head 58 having the blow-off or drain cock 59 therein.

In the operation of the device, the apparatus is let into the tank and power applied to the shaft 5, while the cleansing fluid is introduced through the lateral T opening 8. The fluid descends through the barrel 9, escapes out the slots 60 therein and into the rotary drum 10, pipe sections 21 and 22 and spray heads 27 and 28. The fluid then passes in opposite directions to the spray nozzles and is directed by such nozzles against the top, bottom and walls of the tank to be cleaned. The rotary motion of the shaft 5 through the spider 43 communicates the same movement to the drum 10 and consequently to the spray heads, which are, therefore, revolved about a vertical axis within the tank. In addition the spray heads will be oscillated about a horizontal axis. The nozzles through which the cleansing fluid issues are, therefore, subjected to a compound movement the components of which are a horizontal revolution and a horizontal oscillating movement along axes which are radii of the circle of revolution.

In this way both the bottom, top and sides of the tank may be thoroughly cleansed. Where elbow nozzles are employed such nozzles may be turned, as indicated in Figure 1, or towards the sides of the tank, as indicated in Figure 2, or they may be turned at any angle intermediate these positions. Where straight nozzles are used the tendency will be to drive the stream toward the top and bottom of the tanks and in this way sediment may be cleansed from the tank bottoms, by using elbow but not straight nozzles. Straight nozzles are to clean sides only. The collar 15 is provided with boss 60 riveted to the barrel 9.

From the foregoing it will be appreciated that the mechanism is compact, faithful in operation, easily accessible as to the interior of the drum and other parts, comparatively easy to insert in and remove from a tank and economical in operation.

It is obvious that various changes and modifications may be made in the details of construction and design of the above specifically described embodiment of this invention without departing from the spirit thereof, such changes and modifications being restricted only by the scope of the following claims.

What is claimed is:—

1. A tank washing machine comprising a rotary drum in communication with a source of cleansing fluid supply, a barrel extending into said drum, anti-friction means carried by the barrel for supporting the drum for rotation, spray heads carried laterally by the drum and adapted to rotate on axes substantially radial to the drum, a fixed gear wheel carried by said barrel, revolving gear wheels meshing with the fixed gear wheel and carried by said drum, and connections between said revolving gear wheels and the spray heads for oscillating the latter.

2. A tank washing machine comprising a rotary drum, a slotted barrel extending thereinto, a power shaft extending through the barrel, means for supplying fluid to the barrel, means for connecting said power shaft to drive the drum, spray heads carried by said rotary drum and extending laterally of the drum, a fixed gear wheel on said barrel, revolving gear wheels meshing with the fixed gear wheel, and carried by said drum, and connections between said revolving gear wheels and the spray heads for oscillating the same.

3. A tank washing machine comprising a rotary drum, spray heads carried by the drum and extending laterally of the drum, a slotted barrel extending into the drum, means for supplying the barrel with cleansing fluid under pressure, a power shaft extending through the barrel, a spider for connecting said power shaft to the drum, pinion shafts journaled radially in said spider, pinions on said shafts, a fixed gear wheel carried by said drum and meshing with said pinions, crank arms on said pinion shafts, and jointed links coupled between said crank arms and said spray heads, for oscillating said heads.

STEPHEN F. BLOUIN.